United States Patent [19]

Ossman

[11] Patent Number: 5,142,403
[45] Date of Patent: Aug. 25, 1992

[54] ROS SCANNER INCORPORATING CYLINDRICAL MIRROR IN PRE-POLYGON OPTICS

[75] Inventor: Kenneth R. Ossman, Macedon, N.Y.

[73] Assignee: Xerox Corporation, Stamford, Conn.

[21] Appl. No.: 678,417

[22] Filed: Apr. 1, 1991

[51] Int. Cl.$^5$ .................................................. G02B 26/10
[52] U.S. Cl. ..................................... 359/216; 359/218; 250/236
[58] Field of Search ............... 359/212, 216, 217, 218, 359/219; 250/234, 235, 236

[56] References Cited

U.S. PATENT DOCUMENTS

| | | | |
|---|---|---|---|
| 3,706,484 | 12/1972 | Doi et al. | 359/219 |
| 3,804,485 | 4/1974 | Clarke | 359/216 |
| 3,873,180 | 3/1975 | Bousky | 359/218 |
| 4,230,902 | 10/1990 | Hügi et al. | 178/15 |
| 5,018,805 | 5/1991 | Kessler | 359/217 |

Primary Examiner—Loha Ben

[57] ABSTRACT

The efficiency of a raster output scanning system is enhanced by replacing a folding mirror cylindrical lens in the pre-polygon optics with a single cylindrical mirror. The mirror is designed and positioned to direct a beam input in a different direction along an optical path and to focus the beam in the sagittal plane at an optimum line at the facet surface. The mirror is arranged so that the focus line is parallel to the angle the mirror makes with the system optical axis and coincident with the vertical plane of the polygon facets upon which it impinges.

2 Claims, 2 Drawing Sheets

ROS SCANNER INCORPORATING CYLINDRICAL MIRROR IN PRE-POLYGON OPTICS

BACKGROUND OF THE INVENTION AND MATERIAL DISCLOSURE STATEMENT

The present invention relates to an optical scanner and, more particularly, to a laser raster output scanner (ROS) particularly suitable for use in a compact system design.

Printing systems utilizing lasers to reproduce information are well known in the art. Typically, such systems include a laser for generating a laser beam, a modulator, such as an acousto-optic modulator, for modulating the laser beam in accordance with input information to be reproduced, a multifaceted polygon scanner for scanning the modulated laser beam across a medium on a line to line basis, and various optical components to focus and align the laser beam onto the medium.

In some printing systems it is required that a cylindrical lens be interposed between the modulated laser beam and the scanner to provide a fan fold light output beam which fully illuminates at least one facet of the scanner. The cylindrical lens is preferably aligned with the laser beam to redistribute the energy of the modulated laser beam in a manner whereby the energy distribution of the laser beam incident on the recording medium is substantially symmetrical about the start of scan and end of scan positions of the medium, best focus ideally occurring at the center of the scan line. This is particularly important in those systems which utilize a xerographic recording medium.

A compact design for the scanning optics of these prior art type of printers is desirable to make the machine itself as compact as possible. The scanning system is usually reduced in total area by folding the beam path by the use of a plurality of mirrors. Examples of a compact modular laser printing system are the Xerox 4045 printer and the system shown in U.S. Pat. No. 4,230,902.

It would be desirable to improve the efficiency of these prior art systems by using as few optical elements as possible to decrease hardware costs and assembly and alignment costs. The present invention is directed toward replacement of two elements in the pre-polygon prior art optics, a reflector used to create a folding path, and a cylinder lens. These two elements are to be replaced by a single component, a cylindrical mirror element. This replacement, besides leading to manufacturing economies also provides a more optimum, slow-scan focus at the polygon facets because of the properties of the cylindrical mirror. More particularly the invention relates to a raster output scanning system comprising:

a light source for generating a coherent collimated light beam output along an optical path, a photosensitive image plane, a rotatable multifaceted polygon interposed in the optical path between the light source and the photosensitive image plane for scanning light beams directed onto the facets in a fast scan direction across the photosensitive image plane, a post polygon optical system to focus the reflected lines from the polygon in the fast scan direction, and a pre-polygon optical system including a positive cylindrical mirror positioned in the optical path between the light source and the polygon, cylindrical mirror adapted to change the direction of the optical path through its reflective properties, and to focus the input light to a beam line which has a vertical plane therethrough coincident with a vertical plane through the vertical surface of the facets.

DESCRIPTION OF THE INVENTION

Figure 1:
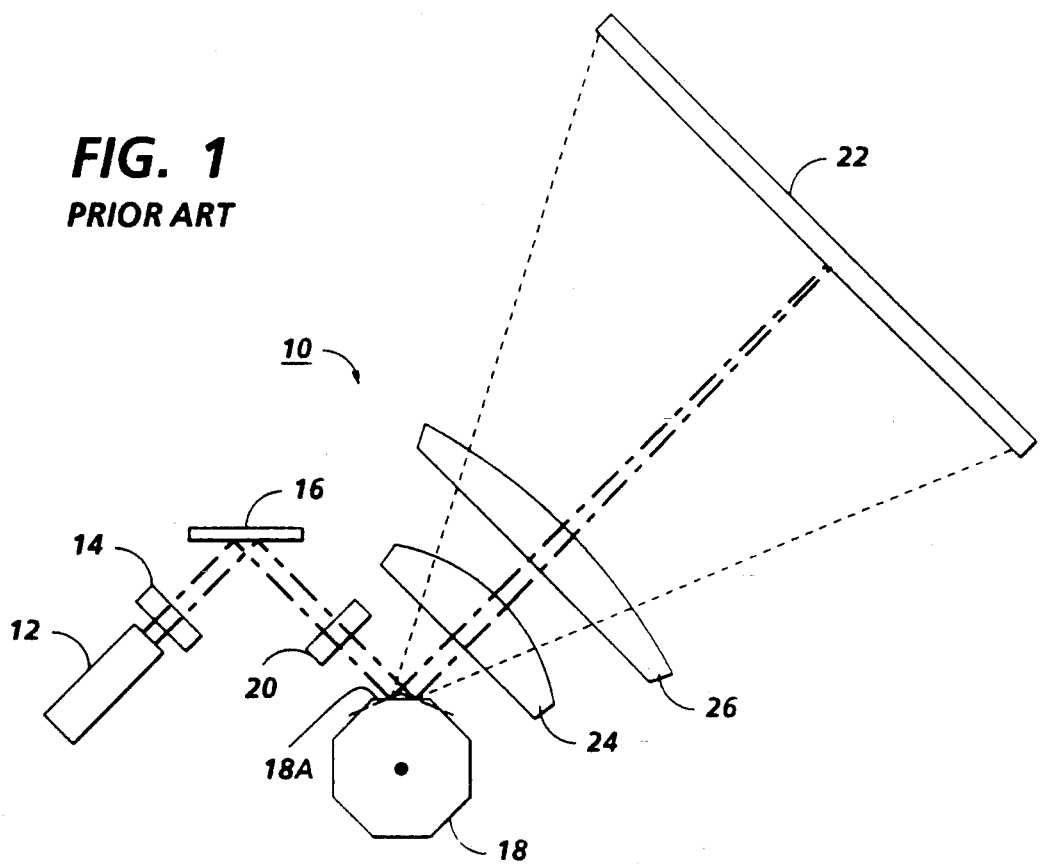
FIG. 1 is a top view in the tangential plane of a prior art ROS scanner.

For purposes of illustration, FIG. 1 shows a prior art ROS type scanner, illustrative of a compact folding system. Scanner 10 comprises a self-modulating laser 12 which serves as the modulated light source. Optical system 14 provides conventional collimation and beam expansion of the output. Collimated output from system 14 is reflected by folding mirror 16 and is focused onto facet 18A of rotating polygon 18, by positive cylindrical lens 20. Lens 20 is also usually aligned to optically correct for polygon-induced sagittal beam position error, (wobble error). The reflected rays from polygon 18 facets are focused in the fast scan direction (tangential plane) at image plane 22 by FΘ lens elements 24, 26.

Figure 2:
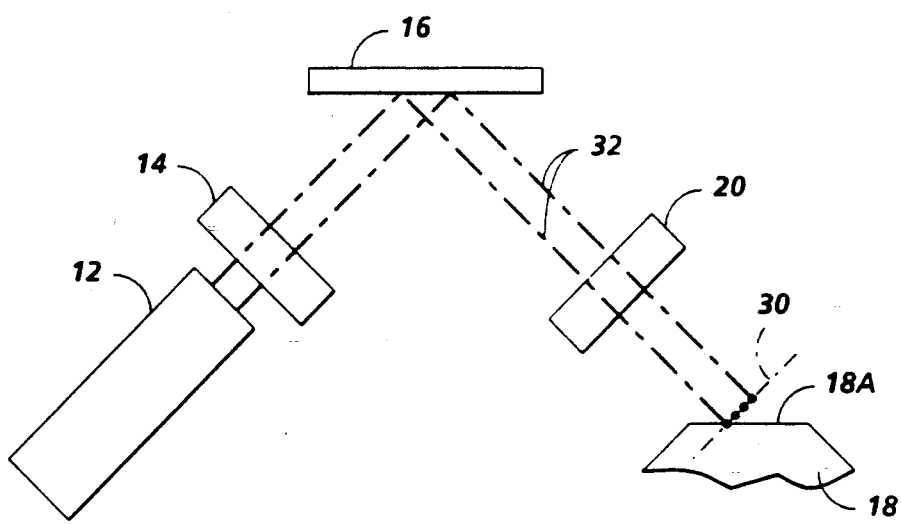
FIG. 2 shows the pre-polygon optics of FIG. 1 illustrating the focal plane of the focused line at the facet surface.
Figure 3:
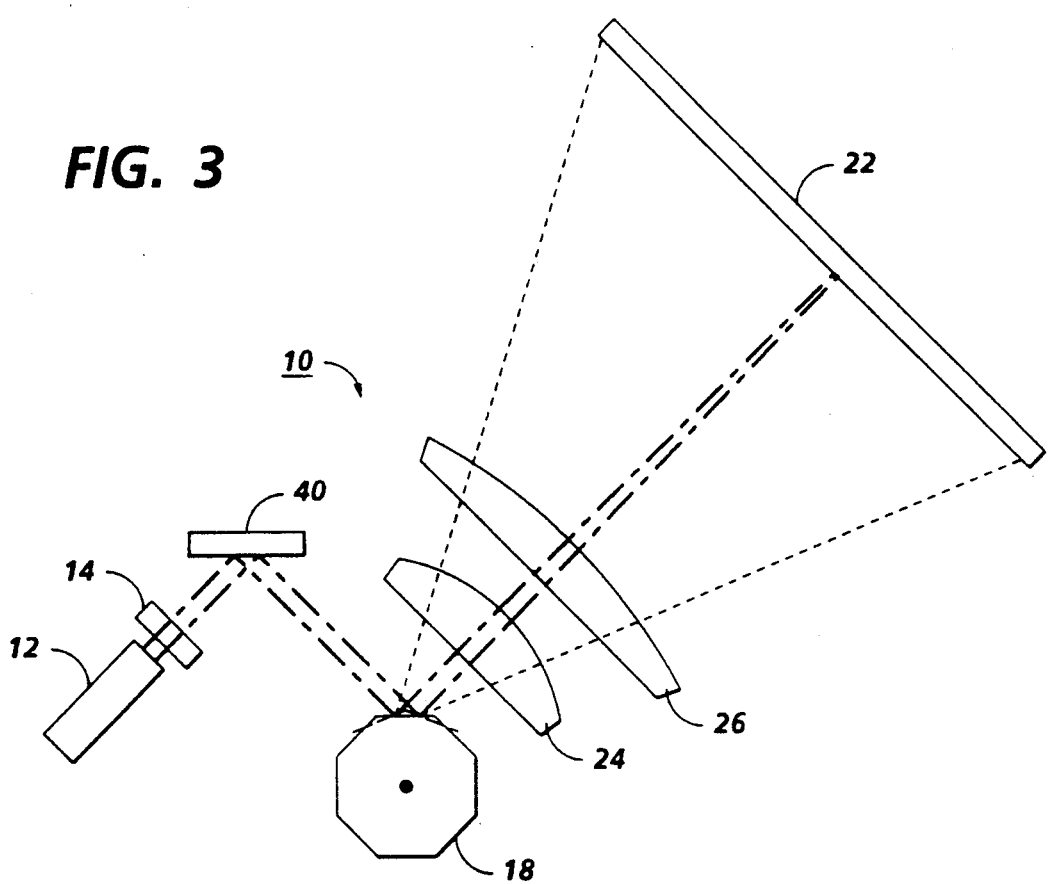
FIG. 3 is a top view in the tangential plane of a ROS scanner which replaces a mirror and cylinder lens in FIG. 1, with a cylindrical mirror.
Figure 4:
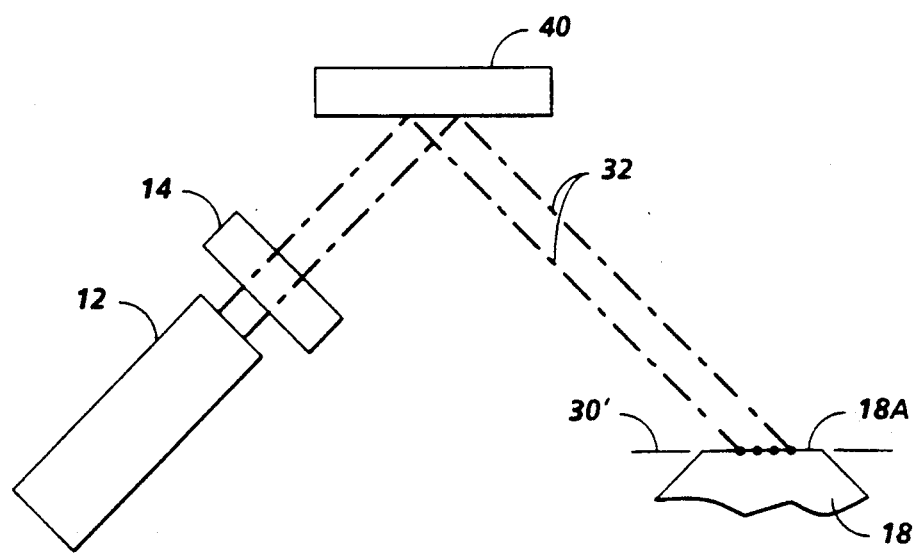
FIG. 4 shows the pre-polygon portion of FIG. 3, illustrating the effect of the cylindrical mirror on the reflected and focused beam in the plane of the polygon facet.

The system shown in FIG. 1 has two disadvantages: 1) two components (mirror 16 and lens 20) are required to provide the proper focus in the slow scan direction at the facet surface, and 2) the scan line at the surface of facet 18A is not at the optimum focus. The reason for this is apparent with reference to FIG. 2 which shows only the pre-polygon optics of FIG. 1. As shown, the beam reflected from the mirror 16 and focused in the cross scan (slow scan direction) creates a focal line 30 which is perpendicular to optical axis 32. Thus, optimum focus is at the vertical plane which passes through the focal line 30 and not at the vertical plane which passes tangentially through the vertical surface of facet 18A. According to the present invention, the mirror 16 and cylindrical lens 20 are replaced by a cylindrical mirror 40, as shown in FIG. 3. Mirror 40 is negatively concave and operates on the collimated light input in the sagittal (slow scan) plane in a way equivalent to lens 20 focusing the beam to a small size at the polygon facet 18A. However, and unlike the situation shown in FIG. 2, the beam focus line is not perpendicular to the optical axis, but rather, is parallel to the mirror surface. This effect is shown in FIG. 4. Here a vertical plane through the focused line 30' is coincident with the vertical plane tangential to the vertical facet surface. In effect, the cylindrical mirror 40 has caused the laser beam focus line to be skewed in an advantageous way. This focus line skew effect can be used to further advantage to control the angle of best focus onto a polygon facet and can be used to enhance the capability of system optics to correct more precisely for facet wobble. This is because the beam can be adjusted to make the focus better through a large scan angle. Some examples of the effects of various beam convergence angles which can be imparted to the cylindrical mirror design assuming the same mirror angle focal length and beam height and width are provided in the table on the following page.

| beam conv. angle (deg.) | mirror angle (deg.) | focal length (mm) | beam width (mm) | beam height (mm) | Phi (deg.) |
|---|---|---|---|---|---|
| .01 | 45 | 100 | 5 | 5 | 45 |
| .1 | 45 | 100 | 5 | 5 | 44.98 |
| .1 | 45 | 100 | 5 | 5 | 46.81 |
| 5 | 45 | 100 | 5 | 5 | 59.95 |
| 10 | 45 | 100 | 5 | 5 | 69.78 |
| 15 | 45 | 100 | 5 | 5 | 76.17 |
| 20 | 45 | 100 | 5 | 5 | 80.68 |
| 25 | 45 | 100 | 5 | 5 | 84.51 |
| 30 | 45 | 100 | 5 | 5 | 88.17 |

Where Phi is the angle between the optical axis and the line of focus created by the mirror.

While the embodiment disclosed herein is preferred, it will be appreciated from this teaching that various alternative, modifications, variations or improvements therein may be made by those skilled in the art, which are intended to be encompassed by the following claims:

What is claimed is:

1. A raster output scanning system comprising
   a light source for generating a coherent collimated light beam output along an optical path,
   a photosensitive image plane,
   a rotatable multifaceted polygon interposed in the optical path between the light source and the photosensitive image plane for scanning light beams directed onto the facets of said polygon in a fast scan direction across the photosensitive image plane,
   a post polygon optical system to focus reflected light beams from said polygon in said fast scan direction, and
   a pre-polygon optical system including a negatively concave cylindrical mirror positioned in the optical path between said light source and said polygon, said cylindrical mirror being adapted to change the direction of the optical path through its reflective properties, and to focus the input light to a beam line which has a vertical plane therethrough coincident with a vertical plane through the vertical surface of each of said facets.

2. The scanning system of claim 1 wherein said cylindrical mirror focuses a collimated light beam to a line at the facet surface which is parallel to said cylindrical mirror.

* * * * *